United States Patent [19]

Herndon

[11] Patent Number: 5,364,420

[45] Date of Patent: Nov. 15, 1994

[54] COMBUSTIBLE MATERIAL TREATMENT PROCESS AND PRODUCT

[76] Inventor: Oma L. Herndon, P.O. Box 117, Hatcheechubbee, Ala. 36858

[21] Appl. No.: 72,445

[22] Filed: Jun. 7, 1993

[51] Int. Cl.$^5$ ............................................. C10L 11/00
[52] U.S. Cl. ........................................ 44/542; 44/545; 44/606
[58] Field of Search ................ 44/605, 606, 620, 542, 44/543, 544, 545, 639, 629

[56] References Cited

U.S. PATENT DOCUMENTS

| | | | |
|---|---|---|---|
| 2,094,661 | 10/1937 | Macleay et al. | 44/544 |
| 3,338,690 | 8/1967 | Calhoun | 44/6 |
| 3,395,002 | 7/1968 | Winnicki et al. | 44/542 |
| 3,928,677 | 12/1975 | Anthony | 427/374 |
| 4,046,518 | 9/1977 | Dalzell | 44/10 B |
| 4,475,923 | 10/1984 | Earlywine | 44/41 |
| 4,485,584 | 12/1984 | Raulerson et al. | 44/66 |

Primary Examiner—John Niebling
Assistant Examiner—Edna Wong
Attorney, Agent, or Firm—Wm. Randall May

[57] ABSTRACT

A process for treating various species of wood or other similar combustible material by vacuum/pressure penetration and impregnation of the combustible material with a flammable substance in order to produce a fire starting or combustion catalyst material with burn characteristics substantially similar to naturally occurring resin enriched woods. The wood or other combustible to be treated is placed within the cylinder of a modified vacuum/pressure autoclave whereupon the air within the cylinder is substantially removed and the cylinder is then filled with a hot flammable liquid such as a liquid paraffin. The autoclave is then caused to be pressurized and the appropriate pressure is maintained within the autoclave cylinder for a sufficient time to insure the desired penetration and impregnation of the wood or other combustible with the flammable liquid.

12 Claims, 2 Drawing Sheets

COMBUSTIBLE MATERIAL TREATMENT PROCESS AND PRODUCT

BACKGROUND OF THE INVENTION

I. Field of the Invention

This invention relates generally to the impregnation of natural wood, or other combustible material with similar characteristics, with ignitable materials, and more particularly to a pressure treating process for penetrating and completely permeating a volume of pre-dried combustible material, such as kiln-dried wood, with a flammable liquid or blend such as liquid paraffin, in order to produce an efficient and effective fire starting material or combustion catalyst.

II. Prior Art and Other Considerations

There exists a growing need and demand for kindling material for use with wood burning stoves, fireplaces, campfires, outdoor grills and other similar applications. Presently, many suppliers of kindling are harvesting and processing naturally occurring, resin enriched, pine stumps for sale as kindling in order to meet this growing need and demand. An overabundance of pine resins within the wood of such stumps cause the wood to have very favorable characteristics for use as kindling, such as easy ignition and extended burn time, thereby making the wood an excellent kindler for fires of all kinds. Unfortunately, continued harvesting of these stumps has greatly depleted the reserves of this naturally occurring resource thereby creating a need for a suitable substitute which can approach or exceed the kindling characteristics of the naturally occurring pine resin kindling.

A number of commercial manufacturers or suppliers have attempted to imitate or reproduce the burn characteristics found in the natural pine resin kindling with substitutes such as sawdust blended and compressed with wax, natural wood immersed in wax, wood particle board coated with wax, pine cones dipped in wax, wax contained within a paper cup, and chemically treated charcoal briquettes. However, these products, while somewhat effective as combustion agents, do not approach the preferred burn characteristics found in naturally occurring pine resin kindling.

SUMMARY OF THE INVENTION

In view of the foregoing, it is an object of this invention to provide a process for vacuum/pressure penetration and impregnation of wood or other similar combustibles with a flammable material in order to produce a combustion catalyst.

Another object of the present invention is to utilize a controlled vacuum/pressure process to penetrate and permeate a volume of a combustible material with a flammable substance.

An advantage of the present invention is the provision of process and product for a combustion catalyst or kindling material which is easily ignitable and has extended burn time.

An advantage of the present invention is the provision of process and product for a combustion catalyst or kindling material which approaches or exceeds the burn characteristics of naturally occurring pine resin kindling.

A further advantage of the present invention is the provision of process for quickly and efficiently penetrating and permeating the entire volume of a combustible material with a flammable material.

In accordance with the features and objects of this invention, a process for treating wood and other similar combustibles comprises the controlled vacuum/pressure penetration and permeation of a volume of combustible material, such as pre-dried wood, with a flammable substance such as liquid paraffin, or blends of flammable substances, in order to produce an efficient and effective combustion catalyst or fire kindler.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
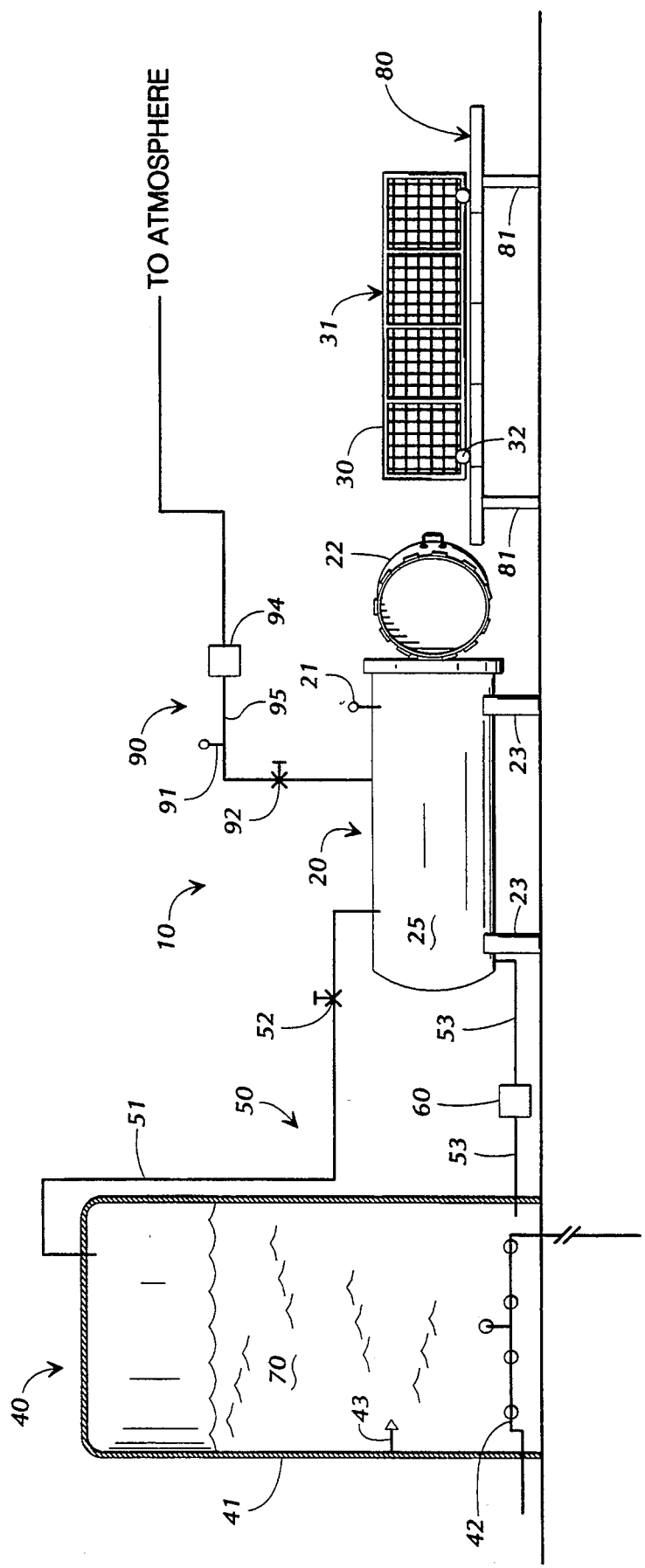
FIG. 1 is a schematic view of a vacuum/pressure treating apparatus and system for treating wood and other similar combustible materials.
Figure 2:
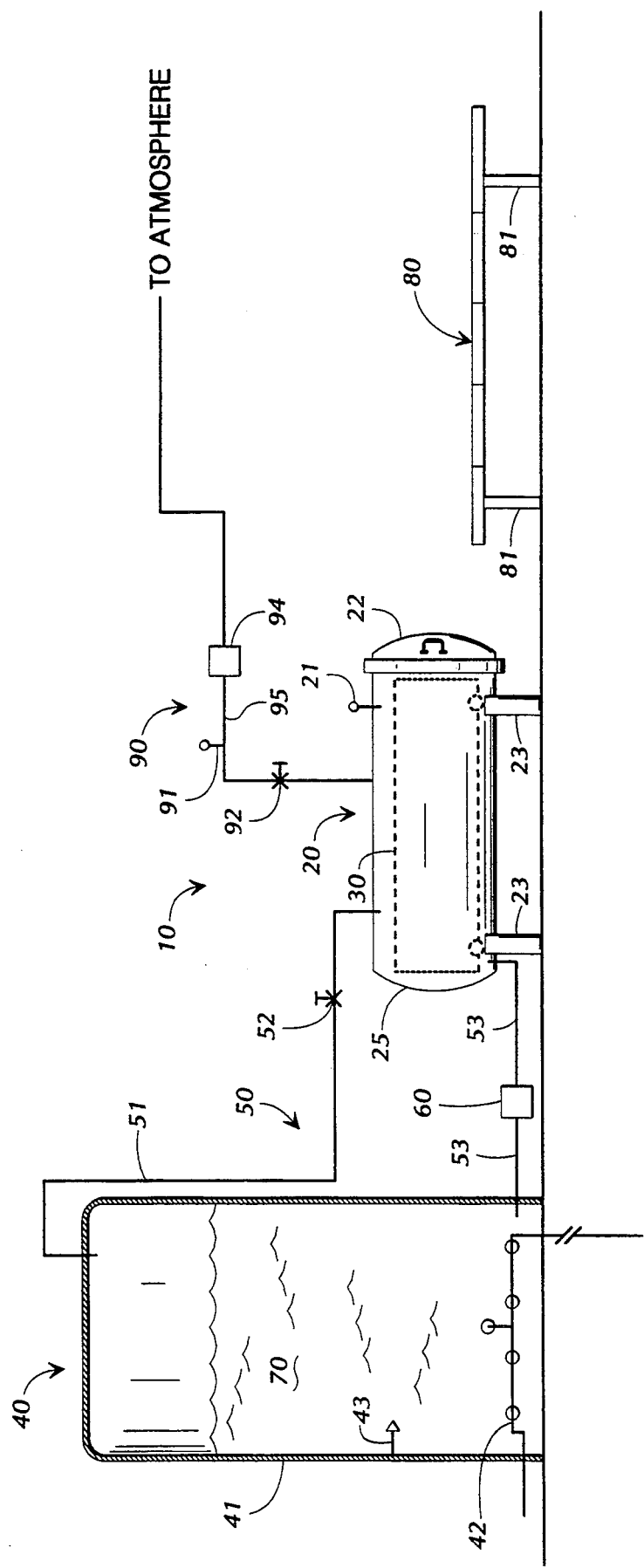
FIG. 2 is a schematic view of the vacuum/pressure treating system of the embodiment of FIG. 1 shown loaded and fully operational.

FIG. 1 shows a vacuum/pressure treating system 10 for vacuum/pressure penetration and permeation of a combustible material with a flammable substance according to an embodiment of the invention. The system 10 comprises a vacuum/pressure chamber 20; a containment means 40 for housing a flammable substance 70; system piping 50; pump means 60; vacuum means 90; a product containment vessel 30; and a track means 80 for loading and unloading the product.

The vacuum/pressure chamber 20 comprises a modified cylindrical autoclave 25 having a hydraulically operated loading door 22, a pressure gauge 21 and support means 23.

The containment means 40 comprises a large enclosed cylindrical tank 41 having a heating means 42, such as steam coils. The heating means 42 is located at or near the bottom of said tank 41 for maintaining the flammable substance 70 at a designated temperature to ensure the substance 70 has proper liquidity and proper heat content for the treatment process. A temperature probe 43 is provided for control of the heating means 42 and thereby controls the temperature of the flammable substance 70 within the tank 41.

The flammable substance 70, in the preferred embodiment, may be any readily combustible, low viscosity, hydrocarbon such as petroleum, petrolatum or paraffin. Paraffin or a paraffin blend is the preferred substance to be used with the present embodiment of the invention. Virtually any type of flammable liquid can be used with the invention and the choice of flammable liquid can vary depending on availability, market conditions, and the type of combustible material to be treated.

The tank 41 is connected to the autoclave cylinder 25 via piping system 50. The piping system 50 is comprised of supply piping 53, exhaust piping 51, and one or more control valves 52. The supply pipe 53 is connected at one end to containment tank 41 at or near the bottom of said tank 41 and at the other end to the bottom of the autoclave cylinder 25. The pump means 60 is situated in-line of the supply pipe 53 somewhere between the containment tank 41 and the autoclave cylinder 25 and controls the flow and pressure of the flammable substance 70 from the containment tank 41 to the autoclave cylinder 25 and also controls the pressure within the autoclave cylinder 25.

The product containment vessel 30 holds a quantity of combustible material 31 to be treated. The vessel 30 is constructed of porous material, such as wire mesh, and has wheels 32 which are configured to ride on track means 80. Said track means 80 allows the containment vessel 30 to be transported to and from the autoclave 25 before and after the treatment process and is supported by supports 81.

The vacuum means 90 is comprised of a vacuum pump 94, vacuum piping 95, a vacuum gauge 91 and one or more vacuum control valves 92. Said vacuum means 90 is used to create an initial vacuum within the autoclave cylinder 25 after the combustible material 31 has been loaded into the cylinder 25 and before the flammable substance 70 is introduced therein. The removal of air molecules from within the autoclave cylinder 25 and the resulting removal of air molecules from the combustible material 31 therein facilitates the treatment process and insures complete penetration and saturation of the combustible material 31 with the flammable substance 70.

In operation, the combustible material 31, such as various species of pre-dried wood (preferably kiln-dried yellow pine), newspaper or other combustible material, is cut, split or otherwise formed or assembled into small units suitable for burning and is loaded into containment vessel 30. The vessel 30 is then wheeled into the autoclave cylinder 25 via track 80 and the autoclave hydraulic door 22 is closed and sealed. Once said door 22 is closed and sealed, vacuum control valve 92 is opened and the vacuum pump 94 is engaged to remove excess air from the combustible material 31. Generally, vacuum levels of between 0" and 27" Hg will be required depending on the combustible material 31 being treated. Once the vacuum process is completed, vacuum control valve 92 is closed and the vacuum pump 94 is disengaged. Pressure valve 52 is then opened and the pump means 60 is engaged to pump the hot flammable substance 70 from the containment tank 41 into the autoclave cylinder 25. Once the cylinder 25 is substantially filled with the hot flammable substance 70 said flammable substance 70 is allowed to remain in the cylinder 25 for a predetermined period of time in an unpressurized or slightly negative pressure state in order to elevate the temperature of the combustible material 31 to that, or substantially that, of the flammable substance 70. Upon proper elevation of the temperature of the combustible material 31 within the autoclave cylinder 25, valve 52 is closed and the cylinder 25 is then pressurized, using pump means 60, to between 1 psi and approximately 250 psi depending on the type of combustible material 31 being treated. The pressure is maintained within the autoclave cylinder 25 until the combustible material 31 has been penetrated and fully permeated with the flammable substance 70. Generally, about 30 minutes is sufficient for proper permeation depending on the volume and type of material to be treated.

Upon achieving the desired permeation within the combustible material 31, the pump means 60 is disengaged and the pressure within the autoclave 25 is slowly released through exhaust pipe 51. Once atmospheric pressure is achieved within the autoclave cylinder 25, all remaining flammable substance 70 is pumped back into the containment tank 41, utilizing pump means 60, whereupon the hydraulically operated door 22 is opened and the containment vessel 30, with the fully treated combustible material 31, is removed, emptied, and the process repeated for another volume of combustible material 31.

While the invention has been particularly shown and described with reference to the preferred embodiment thereof, it will be understood by those skilled in the art that various alterations in form, detail and construction may be made therein without departing from the spirit and scope of the invention.

The embodiments of the invention in which an exclusive property right or privilege is claimed are defined as follows:

1. A method of treating natural wood with a paraffin-based flammable substance in order to produce a high quality kindling material or combustion catalyst having the burn characteristics of naturally occurring pine resin kindling, comprising the steps of:

loading a volume of said wood into a pressure chamber;

substantially evacuating the air from within the pressure chamber;

releasing the vacuum while substantially filling the pressure chamber with hot liquid paraffin;

allowing the wood to remain within the pressure chamber under atmospheric or slightly negative pressure for a period of time in order to absorb heat from the liquid paraffin;

increasing the pressure within said pressure chamber to a level which causes the liquid paraffin to begin to permeate and saturate the wood;

holding the pressure within said pressure chamber for a period of time sufficient to ensure proper penetration and permeation of the wood with the liquid paraffin;

reducing the pressure within the pressure chamber to atmospheric or ambient pressure;

removing the unused liquid paraffin from the pressure chamber; and, removing the pressure treated, paraffin saturated wood from the pressure chamber for cooling.

2. The method of claim 1, wherein said natural wood is coniferous wood.

3. A method of operating a vacuum/pressure treating system for vacuum induced, pressurized penetration and impregnation of natural wood with a paraffin-based flammable substance in order to produce a high quality kindling material having burn characteristics approaching that of naturally occurring pine resin kindling, comprising:

loading a volume of the wood into a containment vessel;

transporting said containment vessel into a pressure chamber;

pressure sealing said pressure chamber in an airtight manner;

engaging a pump means to substantially evacuate the air within said pressure chamber and, to the extent possible, to evacuate the air from said wood;

engaging a pump means to pump hot, liquid paraffin into said pressure chamber;

allowing the wood to absorb heat from said hot, liquid paraffin for a period of time under atmospheric, or slightly negative pressure thereby causing the air molecules within the wood to expand;

increasing the pressure within said pressure chamber to a level which causes the liquid paraffin to begin to penetrate and saturate the wood;

maintaining said pressure level within said pressure chamber until the wood has been thoroughly penetrated and permeated with said liquid paraffin;

releasing the pressure within said pressure chamber;

pumping any remaining liquid paraffin out of said pressure chamber; and, removing the impregnated wood from the pressure chamber for cooling.

4. The method of claim 3, wherein said natural wood is coniferous wood.

5. The method of claim 1, wherein the length of time the wood is allowed to absorb heat from the hot liquid paraffin is dependant upon the volume and type of wood being treated, within the range of 15 to 45 minutes.

6. The method of claim 1, wherein the level of pressure within the pressure chamber is increased to approximately 125 to 175 lbs/in$^2$ depending on the volume of wood being treated.

7. The method of claim 1, wherein the pressure within the pressure chamber, once increased, is held at the increased level for approximately 5 to 30 minutes depending on the volume and type of wood being treated.

8. The method of claim 3, wherein the length of time the wood is allowed to absorb heat from the hot liquid paraffin is dependant upon the volume and type of wood being treated, generally within the range of 15 to 45 minutes.

9. The method of claim 3, wherein the level of pressure within said pressure chamber is increased to approximately 125 to 175 lbs/in$^2$ depending on the volume of wood being treated.

10. The method of claim 3, wherein the pressure within said pressure chamber, once increased, is held at the increased level for approximately 5 to 30 minutes depending on the volume and type of wood being treated.

11. The method of claim 1, wherein said natural wood is southern yellow pine.

12. The method of claim 3, wherein said natural wood is southern yellow pine.

* * * * *